April 4, 1939.   P. A. KINZIE ET AL   2,152,651
HYDRAULIC ROTOR OPERATED BUTTERFLY VALVE
Filed June 13, 1935    10 Sheets-Sheet 4

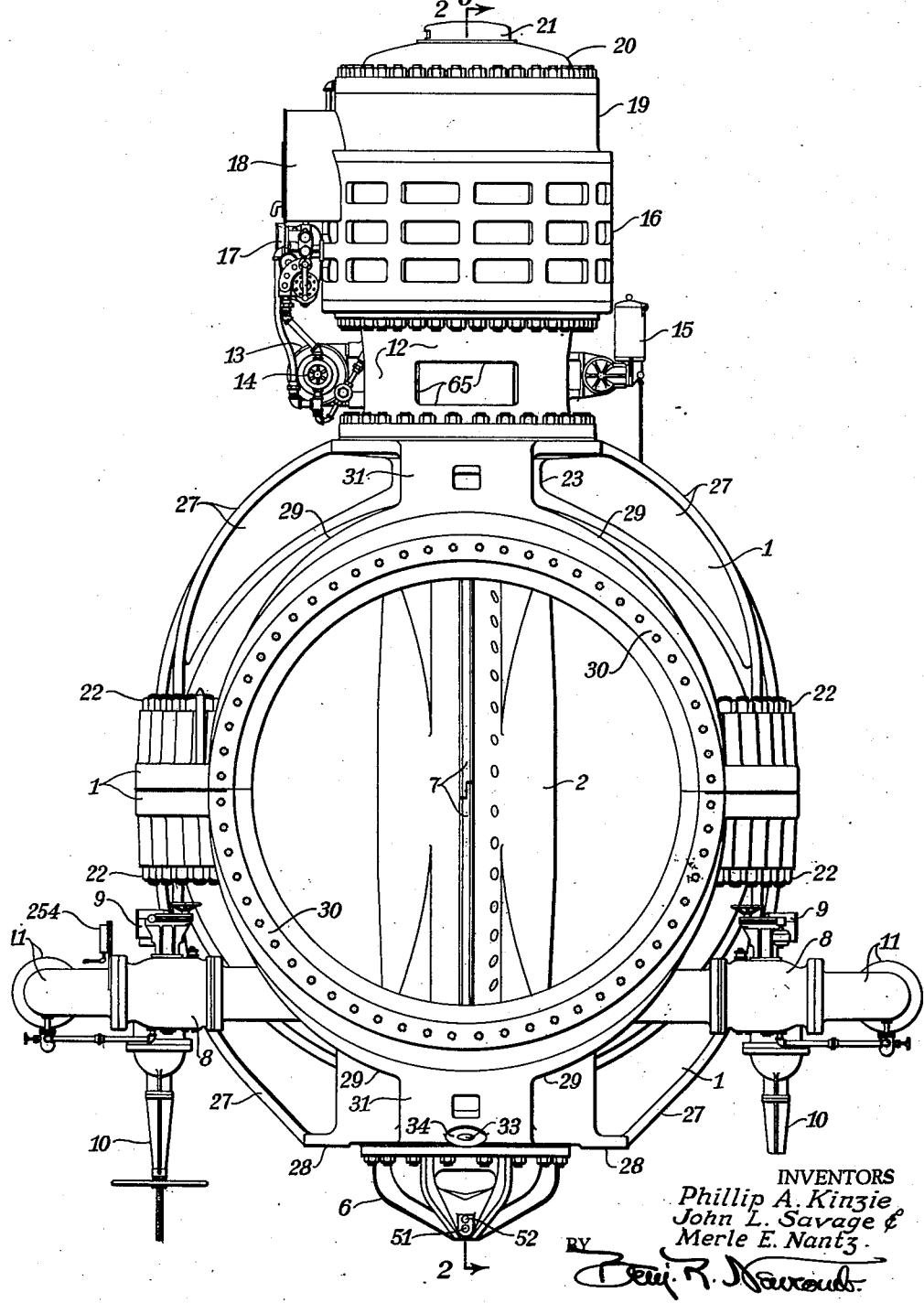

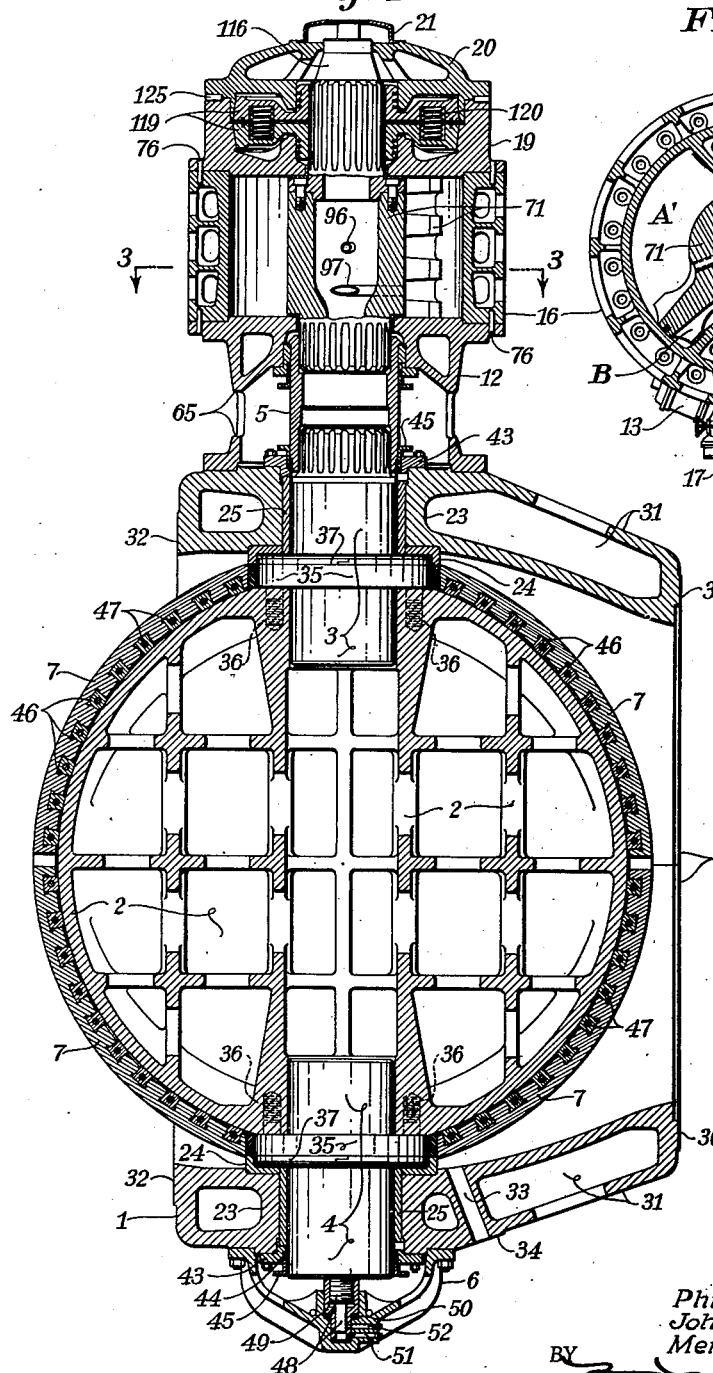
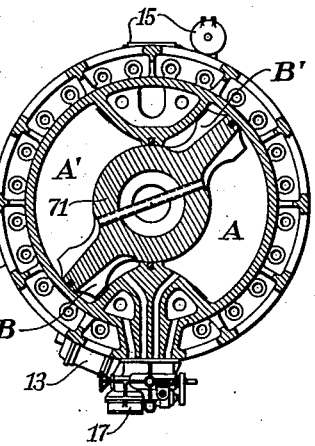

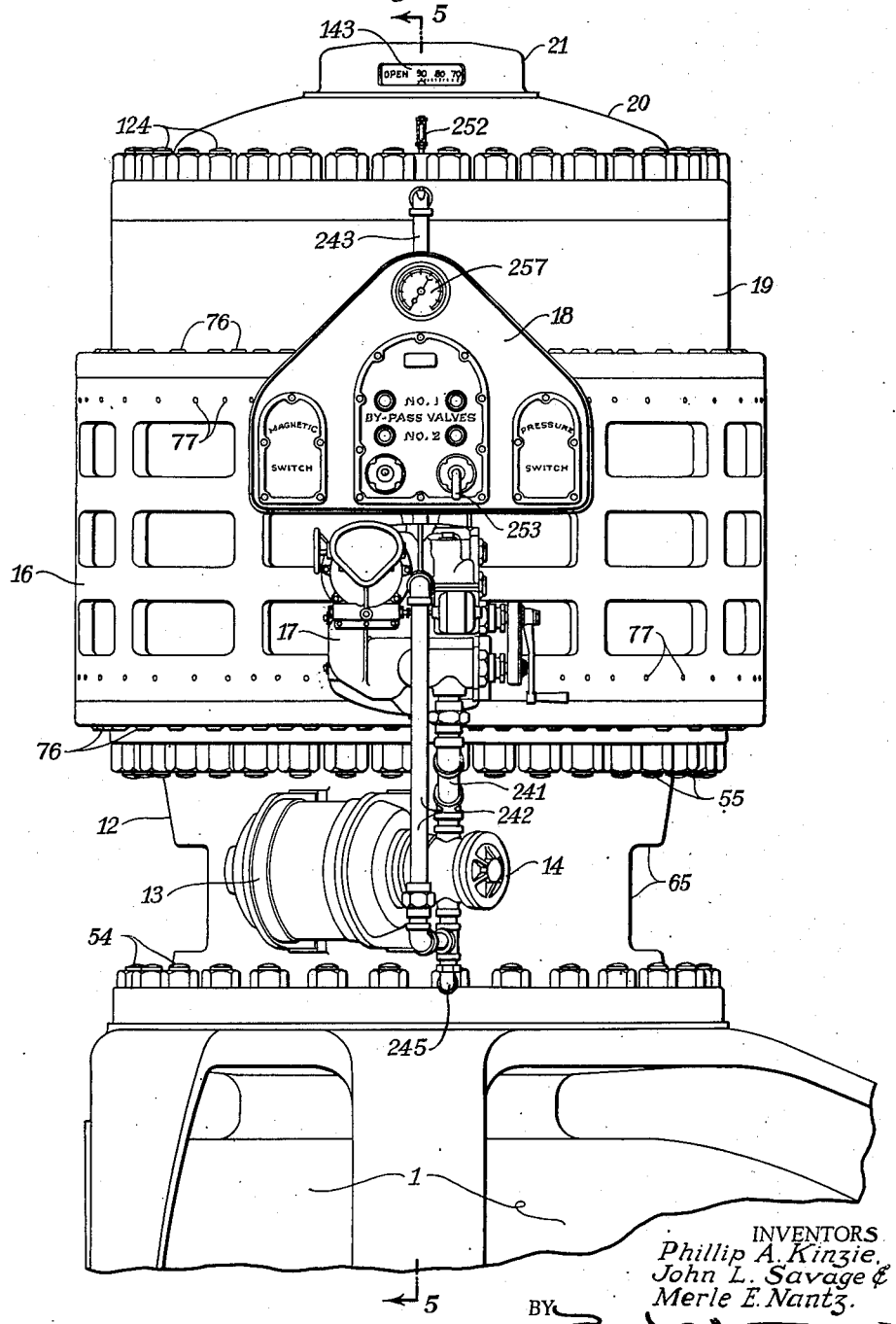

INVENTORS
Phillip A. Kinzie,
John L. Savage &
Merle E. Nantz.
BY
ATTORNEY.

April 4, 1939.  P. A. KINZIE ET AL  2,152,651
HYDRAULIC ROTOR OPERATED BUTTERFLY VALVE
Filed June 13, 1935   10 Sheets-Sheet 5
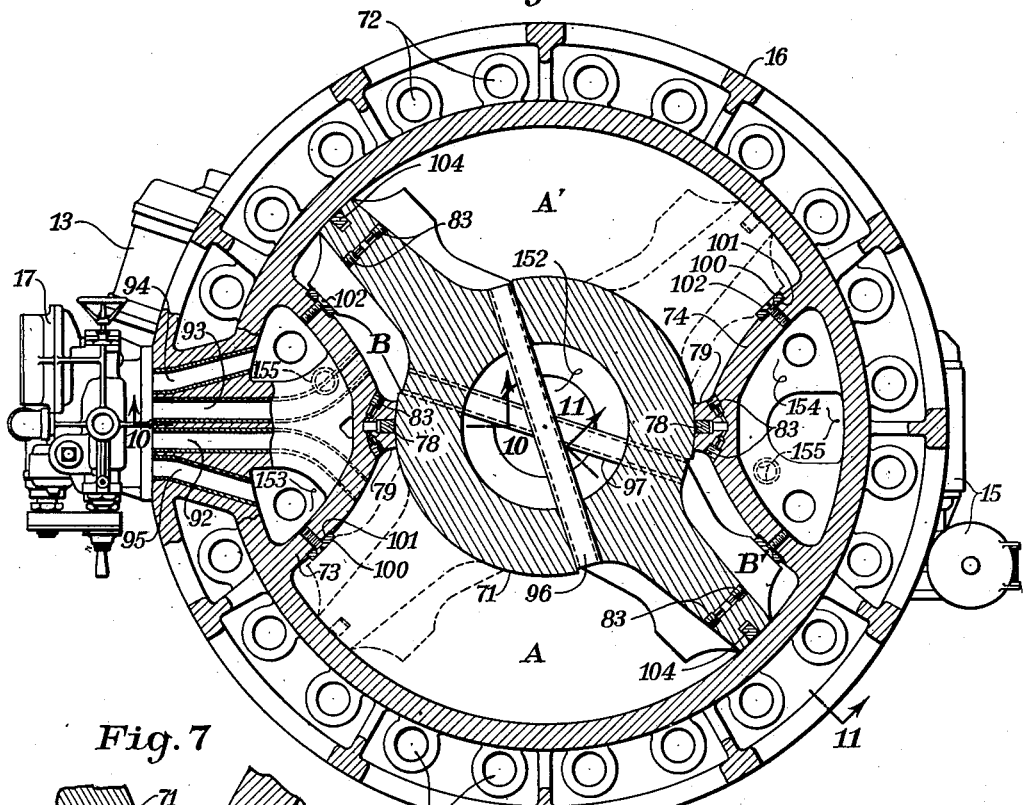
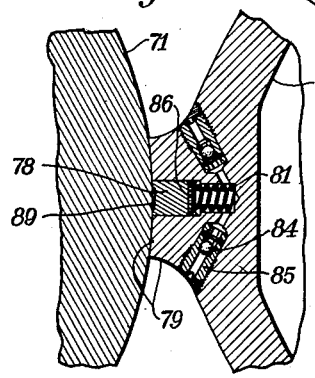
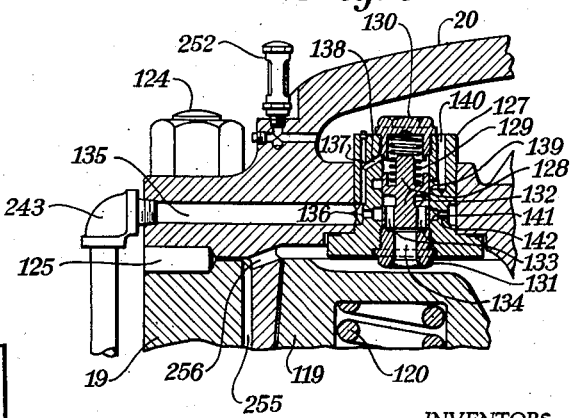
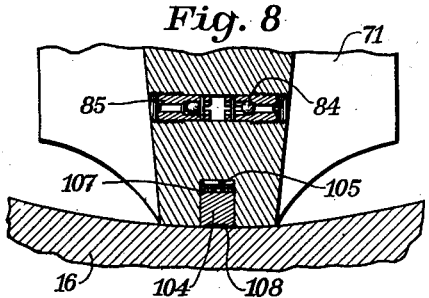
INVENTORS
Phillip A. Kinzie,
John L. Savage &
Merle E. Nantz.
BY
ATTORNEY.

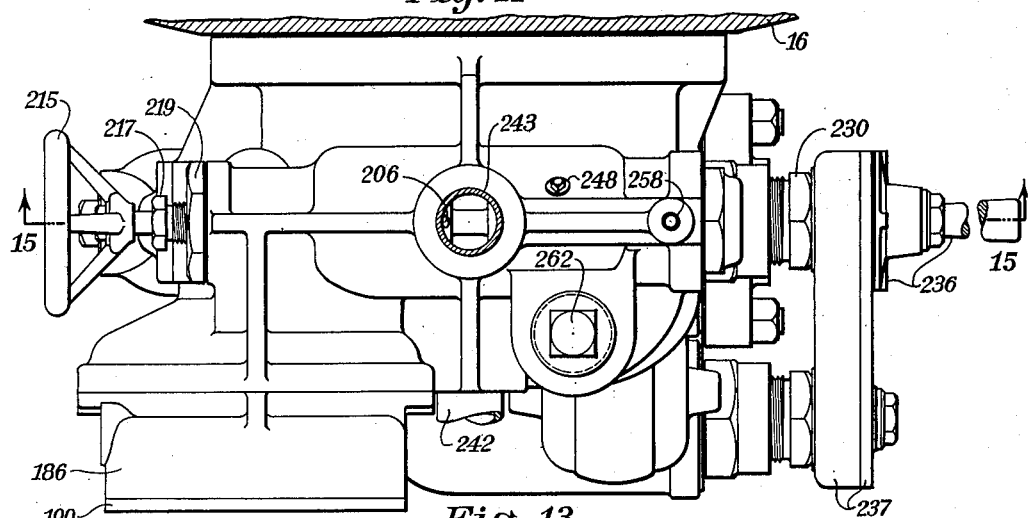
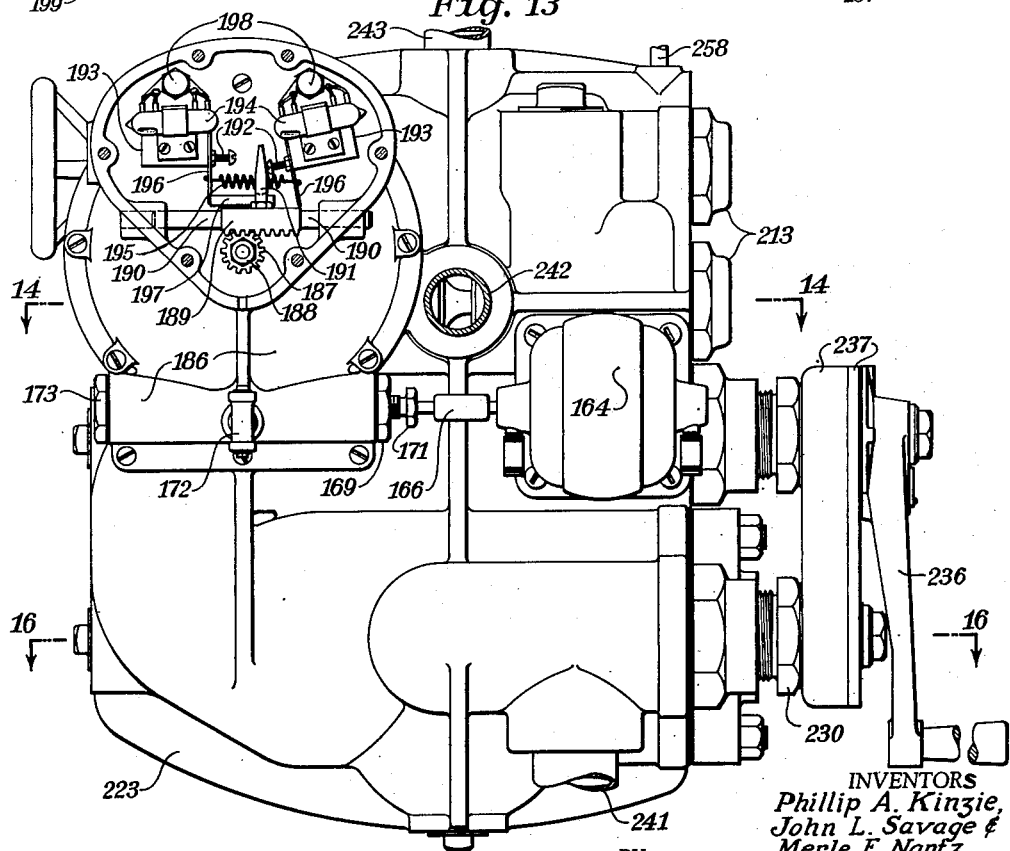

April 4, 1939.  P. A. KINZIE ET AL  2,152,651
HYDRAULIC ROTOR OPERATED BUTTERFLY VALVE
Filed June 13, 1935  10 Sheets-Sheet 8
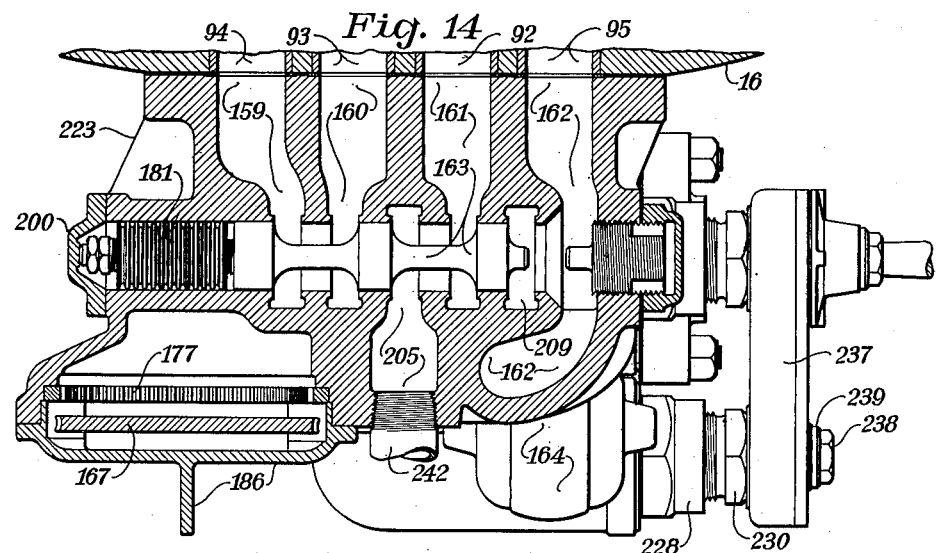
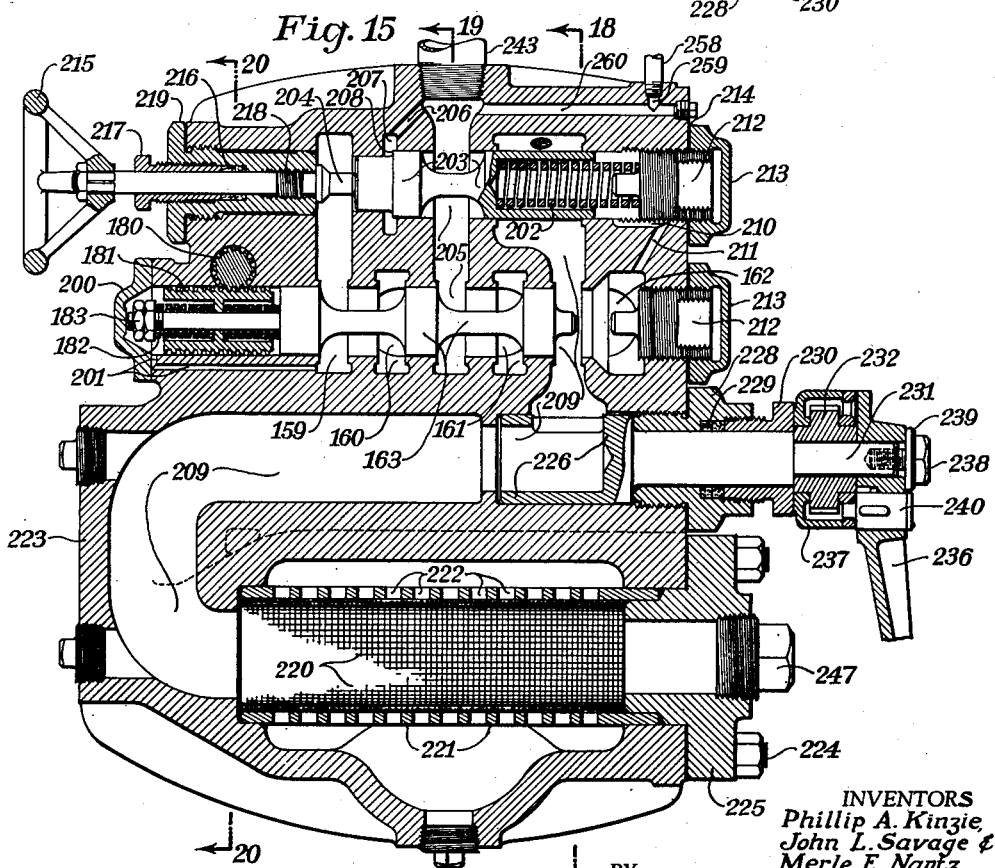
INVENTORS
Phillip A. Kinzie,
John L. Savage &
Merle E. Nantz.
BY
ATTORNEY.

April 4, 1939. P. A. KINZIE ET AL 2,152,651
HYDRAULIC ROTOR OPERATED BUTTERFLY VALVE
Filed June 13, 1935 10 Sheets-Sheet 9
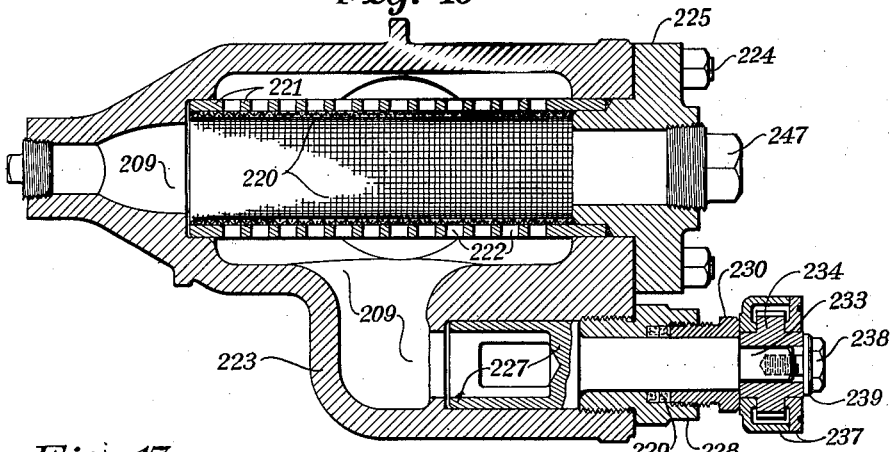
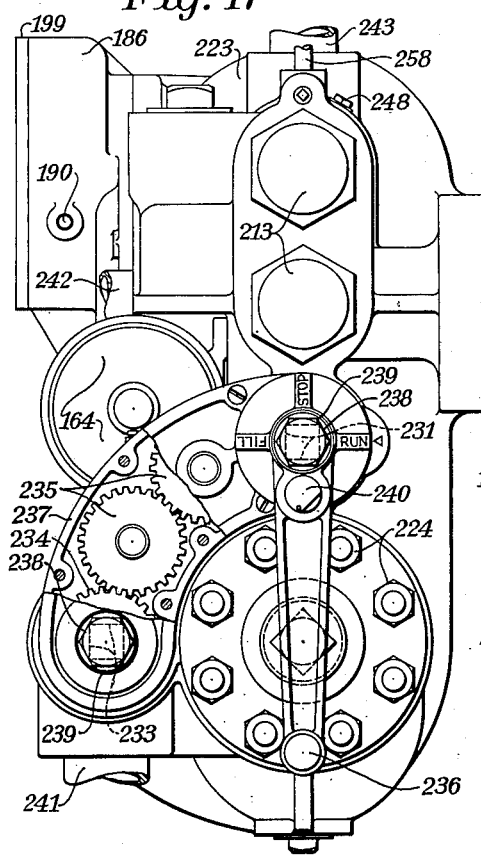
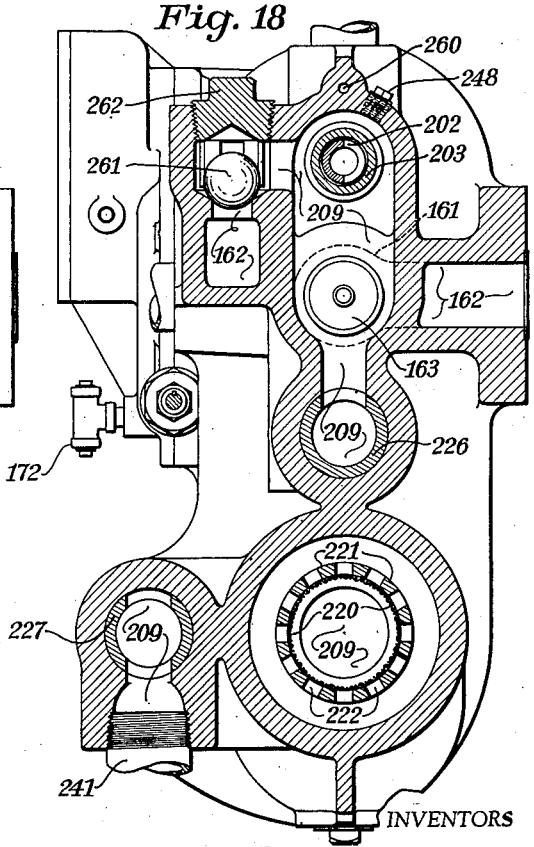
INVENTORS
Phillip A. Kinzie
BY John L. Savage & Merle E. Nantz
ATTORNEY.

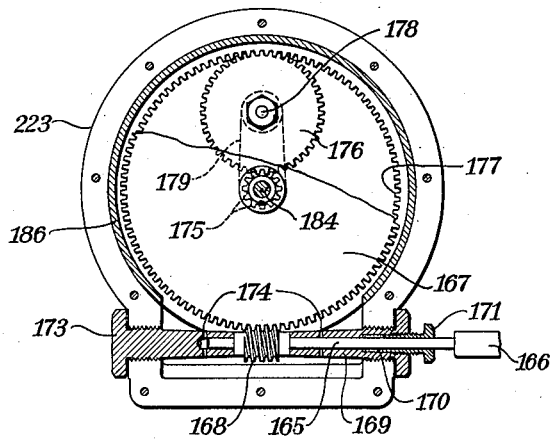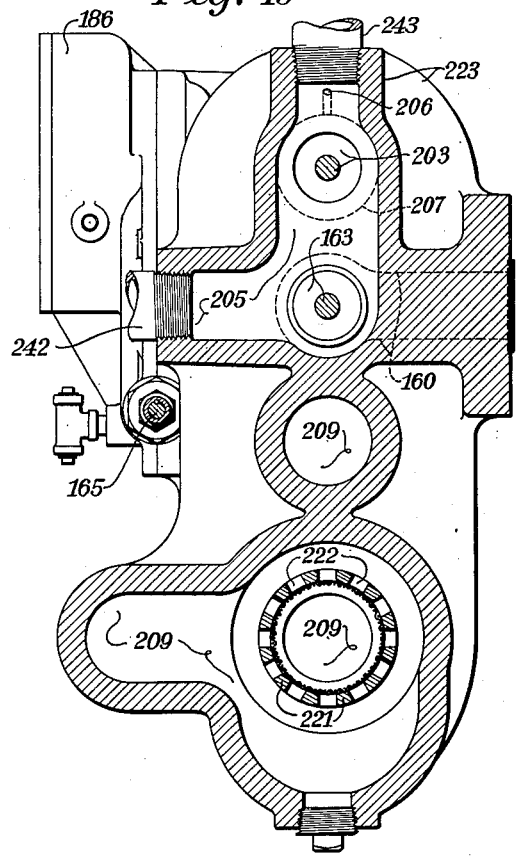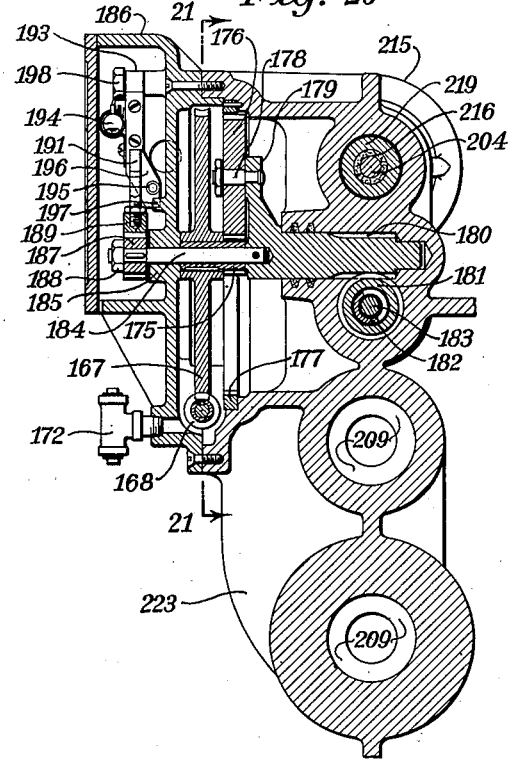

Patented Apr. 4, 1939

2,152,651

UNITED STATES PATENT OFFICE 2,152,651

HYDRAULIC ROTOR OPERATED BUTTERFLY VALVE

Phillip A. Kinzie, John L. Savage, and Merle E. Nantz, Denver, Colo., assignors to Universal Hydraulic Corporation, Denver, Colo., a corporation of Colorado Application June 13, 1935, Serial No. 26,386

4 Claims. (Cl. 137—139)

This application relates to improvements on valves and hydraulic torque mechanism; wherein, closure is effected by torque applied to a pivotally mounted closure member; more particularly, to butterfly valves of the type disclosed in the co-pending application, Hydraulic rotor operated valve, Serial Number 660,284, filed March 10, 1933, and now Patent No. 2,053,668, granted Sept. 8, 1936.

The valve, torque mechanism and appurtenant features, as described in this application, are primarily intended for severe service, wherein unusually large water loads are imposed on the closure member with the resulting enormous torques required for successful operation of the closure member, as is the case in many of our modern power plants. While the foregoing is cited as a specific application of our invention, the field of usefulness extends to all installations where the flow of a fluid is interrupted within a pipe or conduit in a manner analagous to that of a butterfly valve. Further, the torque mechanism may be readily applied to installations other than valves, where powerful, compact torque units are used; such as, steering gear mechanisms for ocean liners or other naval vessels.

Our invention has as an object, a torque unit, rigidly mounted on the valve body member and concentric with the stem bore and pivotal axis of the closure member.

Our invention has as an object, the arrangement, whereby all torque reactions are dissipated within the valve structure.

Our invention has as an object, a flexible means, whereby torque is applied to the closure member without imparting bending moments to said closure member or the interconnecting elements.

Our invention has as an object, a flexible means, whereby deflections of the closure element when subjected to fluid pressure are not transmitted to the torque producing unit.

Our invention has as an object, a means, whereby the aforementioned flexible element operates in a bath of oil, further, said oil bath is protected against the intrusion of foreign solids or liquids of an abrasive or corrosive nature.

Our invention has as an object, the improved arrangement of the oil reservoir system wherein all reservoir areas are interconnected by a central passage with appropriately disposed connecting ports.

Our invention has as an object, the improved arrangement wherein oil is delivered directly to the operating chambers through the housing cylinder without the use of cored ports.

Our invention has as an object, the improved arrangement for directing oil into the diametrically opposed operating chambers by ports directly through the torque imparting member.

Our invention has as an object, an improved construction, wherein, the torque reaction elements or stators become integral and symmetrical elements of the housing cylinder.

Our invention has as an object, an improved brake release means, whereby fluid used for releasing the brake members is automatically discharged directly into the main reservoir upon release of the pressure within the operating chambers.

Our invention has as an object, a means, whereby a control unit is attached to the torque unit without the use of auxiliary piping.

Our invention has as an object, a self-contained control unit, with a single hydraulically balanced control valve, operated by electrically actuated means, automatically controlled, and so arranged that movement along its axial center line effects control of the torque unit.

Our invention has as an object, an automatic spring-loaded relief means within the control unit, whereby excessive pressure is relieved by by-passing operating fluid to the reservoir.

Our invention has as an object, a means, whereby all operating fluid originally introduced into the reservoir system or afterwards circulating through said system during operation of the torque unit, is kept free of foreign substances by means of a screen built into the control unit.

Our invention has as an object, the means, whereby the torque unit can be hydraulically locked by the use of co-ordinated valves within the control unit.

Our invention has as an object, an auxiliary sealing means on the stem elements of the butterfly valve leaf, which allow the removal and replacement of the stem packing or bushings while the valve is in service in the fully opened position.

Further, our invention has as an object, the automatic co-ordination and sequencing of all component elements by use of inter-related electrical, hydraulic and mechanical controlling means.

Further our invention has as an object, an arrangement wherein all component parts of a butterfly valve blend into and compose a compact and harmonious structure.

With the foregoing in view there will now be described specific embodiments of the invention for the purpose of satisfying the patent statutes, and which have been illustrated in the accompanying drawings forming a part hereof, and wherein:

Figure 1 is an elevation of the complete butterfly valve unit, looking upstream along the axial center line of flow;

Figure 2 is a sectional view taken on the plane 2—2 of Figure 1;

Figure 3 is a sectional view taken on the plane 3—3 of Figure 2;

Figure 4 is an elevation of the hydraulic rotor;

Figure 6 is a sectional plan view taken substantially on the plane 6—6 of Figure 5;

Figure 7 is an enlaged fragmentary section of Figure 6 showing the stator seal and check valves;

Figure 8 is an enlarged fragmentary section of Figure 6 showing the rotor seal and check valves;

Figure 9 is an enlarged fragmentary section, taken at the top of Figure 5, showing the brake release valve;

Figure 12 is a plan view of the rotor control unit;

Figure 13 is a front elevation of the rotor control unit;

Figure 14 is a sectional plan taken on the plane 14—14 of Figure 13;

Figure 15 is a sectional view taken on the plane 15—15 of Figure 12;

Figure 16 is a sectional view taken on the plane 16—16 of Figure 13;

Figure 17 is an end elevation of the rotor control unit;

Figure 18 is a sectional view on the plane 18—18 of Figure 15;

Figure 19 is a sectional view taken on the plane 19—19 of Figure 15;

Figure 20 is a sectional view taken on the plane 20—20 of Figure 15;

Figure 21 is a sectional view taken on the plane 21—21 of Figure 20.

Figure 5:
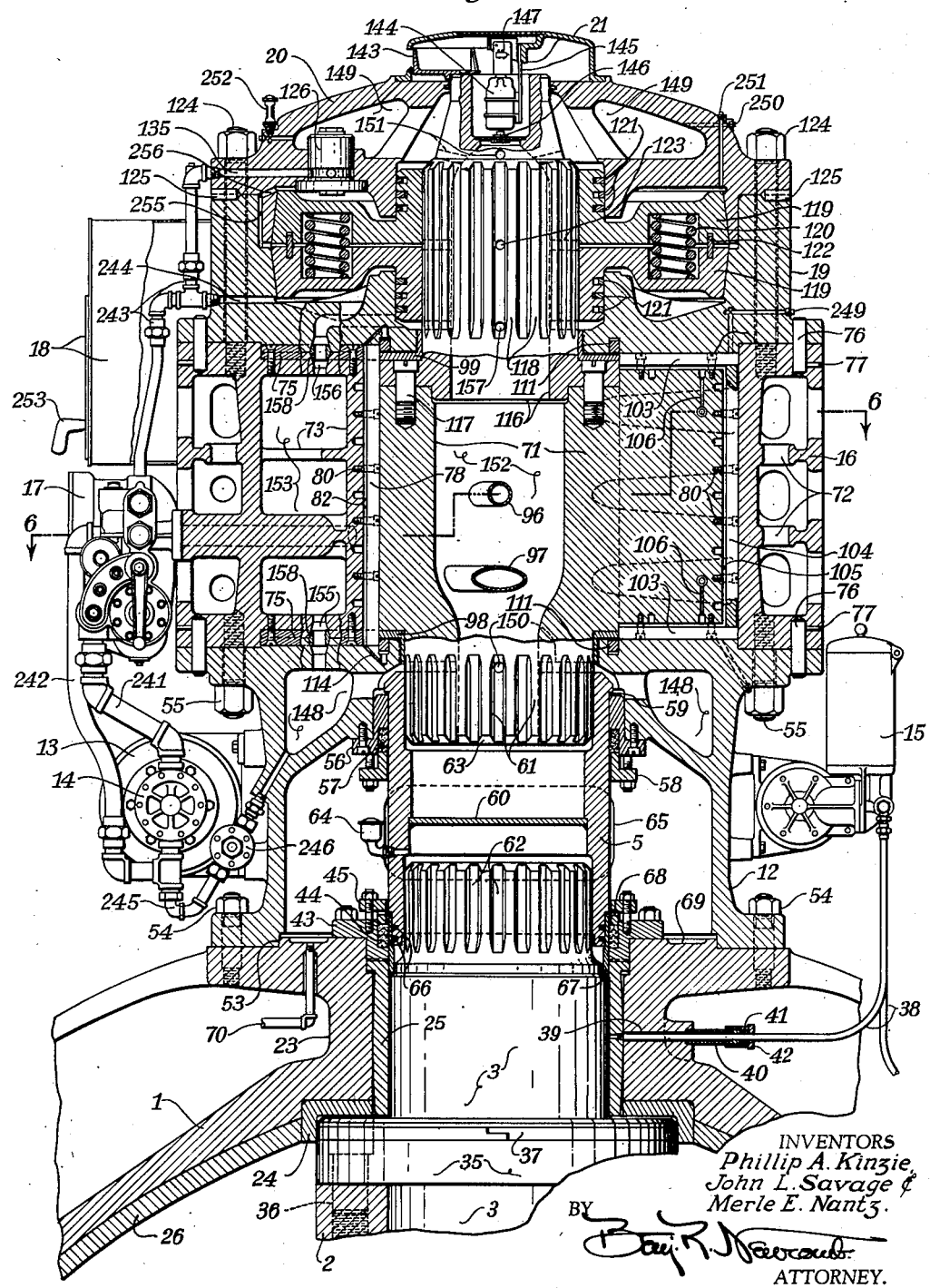
Figure 5 is a sectional view taken substantially on the plane 5—5 of Figure 4.
Figure 10:
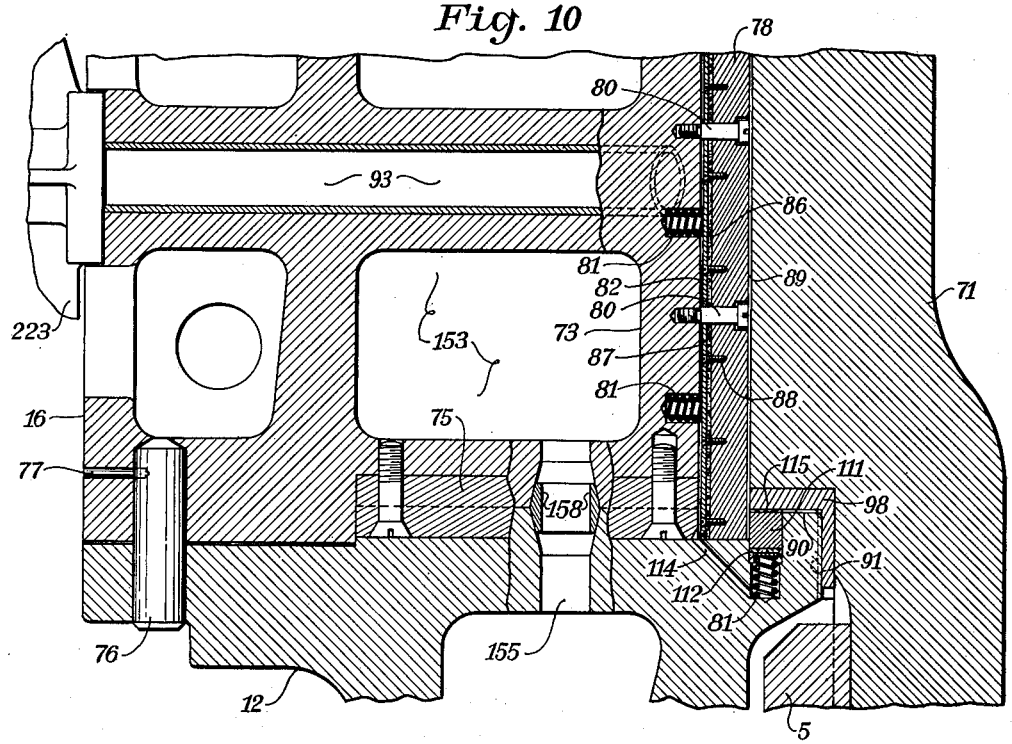
Figure 10 is a sectional view taken on the plane 10—10 of Figure 6.

By reference to the accompanying drawings it will be seen that the water passage member or body 1 has the pivotally mounted closure member or leaf 2 retained within the interior by the stems 3 and 4, set into mating bores at the top and bottom of the leaf and extending through the bores in the hubs of the body 1. The upper stem 3 communicates with the torque unit by means of the coupling 5 while the lower stem 4 is received within spider bearing 6 and axially supports the leaf 2, stems 3 and 4 and the leaf seals 7 which are retained within a groove at the periphery of the leaf 2. Two by-pass units, consisting of: the needle valves 8, the electrically operated needle valve controls 9, the manually operated emergency gate valves 10 and the interconnecting piping 11, are symmetrically mounted on opposite sides of the body 1.

The torque unit is superimposed on the upper flange of the body 1 and is aligned and secured thereon by the rotor base 12, on which is mounted the motor 13, oil pump 14 and the grease pump unit 15. The cylinder 16 is mounted on the upper flange of the rotor base 12 and has mounted thereon, the rotor control unit 17 and the control panel 18. Mounted above is the brake cylinder 19 and the cover 20 with the indicator cover 21 on top. The foregoing assembly is shown on Figures 1, 2, and 3.

The body 1 is composed of two halves bolted together on the horizontal center line by the studs 22. In order to provide the necessary number of studs to resist the parting effort of the water pressure and still secure adequate space for tightening the studs 22, they are alternately extended through the upper and lower flanges of the body 1. At the top and bottom of the body the hubs 23 (Fig. 2) are bored to receive the stem collars 24 and the rocking bushings 25.

Rigidity of the body for supporting the torque unit and leaf as well as the body itself is very essential to prevent the body becoming out of round and preventing the proper seating of the sealing members 7—Figure 2—on the leaf with the cooperating seating members 26—Figure 5— in the valve body 1. Rigidity is secured by means of the semi-crescent T shaped ribs 27 on the transverse pivotal center line, which extend from the upper and lower flanges of the valve body and blend into the supporting pads 28—Figure 1. The reducing cone shape of the body is another factor in securing a rigid member. The rigidity of the body is further augmented by the crescent shaped extensions 29 on the downstream flange 30 which are connected to the hubs 23 by the longitudinal rib sections 31—Figures 1 and 2. The upstream flange 32 has similar crescent shaped extensions connecting directly with the upper and lower hubs 23.

The hole 33 and flange face 34 are provided for attaching suitable drainage piping.

The inwardly extending stub ends of the stems 3 and 4 are pressed into vertically aligned symmetrical bores in the hubs of the leaf 2 allowing the stem flanges 35 to bear tightly against the outwardly facing mating surfaces of the leaf. The fitted screws 36 through the stem flanges 35 are threaded into the leaf and transmit the turning effort of the torque unit to the leaf and maintain the stems in rigid attachment thereto. Each of the stem flanges has a turned groove containing the piston rings 37, which are retained within the groove by the stem collars 24—Figures 2 and 5. The outwardly extending ends of the stems are journaled within the rocking bushings 25, which are contained in bores through the body hubs 23. These rocking bushings 25 are loosely fitted within their mating bores and have their exterior surface curved, so that, when the leaf deflects the attendant angularity of the stems (about 10 minutes in this case) is compensated by the bushing rocking to a position normal to that angle; thereby preventing any reverse bending moments in the stems or causing excessive bearing pressures within the journal. A complete description of this bushing is given in the application, Rocking bushing, Serial Number 738,205, filed Aug. 3, 1934, now Patent No. 2,103,465, granted December 28, 1937. Grease is delivered to the bearing through the pipes 38—Figure 5—threaded into the rocking bushings 25 and passing through the drilled hole 39 which is of slightly greater diameter than that of the pipe 38. A thread at outer end of the drilled hole 39 receives the packing member 40 containing the packing 41 which is retained by the gland 42. Thus it will be seen that as the bushing rocks, the vertical motion will be compensated by the enlarged hole 39 while lateral motion will be free to compensate itself through the slip joint effected by the packing members. A further object for providing the clearance around the pipe 38 is that it allows a communicating relief pipe (not shown) to be attached to the packing member 40 and thereby regulate the grease pressure in the space between the exterior curved surface of the rocking bushing and the bore of the hub 23. The stuffing box 43 containing the packing 44 which is retained by the gland 45 also serves to prevent rotation of the rocking bushing by means of a key on the center line of flow which engages a mating keyway in the rocking bushing as is fully described and illustrated in the aforementioned Rocking bushing application. It will be noted that slight clearances are allowed on the interior diameters of the stuffing box 43 and the gland 45 so that the angularity of the stems will not cause cramping or crushing at these points. The packing 44 within the stuffing box 43 tightly contacts the adjacent surfaces of the stems; being plastic enough to compensate for the minute movements due to the leaf deflection and still maintain a tight seal; thereby preventing the escape of grease or water. It will also be noted that the piston ring 37 and the packing 44 form a dual seal, thereby allowing the packing 44 to be replaced and permitting the removal of the stuffing box 43 and rocking bushing 25 without dewatering the penstock or conduit; the leaf being retained by the stem flanges 35 within the mating counterbores in the stem collars 24.

The leaf seals 7 at the periphery of the leaf 2—Figure 2—are adjustable by means of the wedges 46 and the adjusting screws 47 in order to effect water tight sealing of the leaf in the closed position. A further and complete description of these seals is given in the application, Leaf seal locking device, Serial Number 752,200, filed November 9, 1934, now Patent No. 2,083,154, granted June 8, 1937.

The weight of the leaf and integral parts is supported on the body by the spider bearing 6—Figures 1 and 2. The threaded portion of the reduced stem extension 48 is matingly received within the adjusting nut 49 which rests on the roller type anti-friction bearing 50; retained within the central bore in the spider bearing 6. The stem extension 48 and adjusting nut 49 comprise a leaf positioning means, wherein, the nut is held stationary by inserting a pin in the nut 49 through the lower hole 51, and rotating the leaf either manually or by use of the torque unit, the correct vertical position of the leaf is obtained. The pin is then removed from the lower hole 51, and a hole is drilled through the adjusting nut into the stem extension, using the upper hole 52. A dowel driven into this drilled hole will cause the stem extension and adjusting nut to rotate in unison and thereby retain the leaf in the adjusted position.

By reference to the Figures 1 to 11, it will be seen that the rotor base 12 is positioned concentrically with respect to the bores in the hubs 23 of the body 1 and the normal axes of the leaf 2 by the turned shoulder 53 which is matingly received by the bore in the rotor base 12—Figure 5. Further, the lower flange is rigidly secured to the upper flange of the body by the fitted studs 54 which also serve to transmit the torque reaction to the body. The upper flange of the rotor base 12 is concentrically attached to the cylinder 16 by the studs 55. Within the central counterbore the downwardly facing stuffing box 56; containing the packing 57 which is retained by the gland 58, prevents the escape of the operating fluid (oil) around the coupling 5. The diaphragm 60 which is welded within the central bore of the coupling 5 prevents oil escaping through the interior of the coupling.

Thus it will be seen that the shoulder 59 on the coupling by bearing against the stuffing box 56 will retain the coupling 5 with torque unit, and eliminate the necessity of draining the operating fluid therefrom should it be desired to remove the assembled unit.

The upper and lower portions of the coupling 5 matingly engage the splines 61 on rotor hub 63 and the splines 62 on the upper stem 3; the slight clearances allowed when machining these splines being sufficient to accommodate the misalignment between the rotor hub 63 and the upper stem 3 due to the deflection of the leaf.

An oil cup 64 is provided for oiling the stem splines 62; access for oiling being provided through the symmetrical openings 65 in rotor base. Unreasonable escape of oil from this area is prevented by the felt packing rings 66 in the reduced end of the coupling 5 which enters the sheath 67 which is welded fluid tight to the upper stem. The escape of oil around the top of the sheath is an advantage since it will prevent the entrance of any water, which may escape past the packing 44, from entering and corroding the splines. The relief holes 68 prevent a counteracting head of water being built up at the coupling and sheath joint by allowing all escaping fluid to pass through the wall of the gland. Waste fluids will be collected in the circular recess 69 and removed by the pipe 70 thereby preventing unsightly streaks on the exterior of the valve body. With the foregoing construction in mind it will be apparent that the splines are completely protected against the intrusion of foreign fluids or solids.

The cylinder 16, in which the rotor 71 is contained—Figures 3, 5, and 6—is of ribbed construction, having a relatively thin-walled interior cylinder reinforced by circumferential and vertical T shaped ribs; thereby, producing a cylinder which is more rigid, cheaper, and more easily manufactured than a cylinder of comparative strength made with a single heavy wall. It will be noted that the core holes 72 in the circumferential ribs are reinforced by a small bead which carries the stresses around these holes and prevents their weakening the rib section.

Diametrically opposite on the interior of the cylinder 16—Figures 3 and 6—are the torque reaction members or stators 73 and 74; formed by inwardly curving walls originating at the interior of the cylinder wall. The tendency of the stators to rotate about their own centers as well as the tendency to rotate the cylinder about the central axes is overcome by the keys 75—Figures 5 and 10—secured to the top and bottom of the stator elements and entering mating keyways in the rotor base 12 and brake cylinder 19, and by the dowels 76 secured in the cylinder by the auxiliary pins 77—Figures 5, 10, and 11. Aside from the purpose of transmitting the torque reactions, the dowels 76 are located in such a manner that they aid in preventing undesirable deflections of the cylinder walls when pressure is imposed in either chambers A and A' or B and B'—Figures 3 and 6. The inwardly extending portion 79 on the stators—Figures 6 and 7—is bored to receive the rotor 71 and is grooved to receive the rectangular seal bars 78. These bars are retained within their respective grooves by the shouldered fillister head cap screws 80—Figure 10. The seal bars 78 are held in contact with the curved surface of the rotor 71 by the springs 81 and by introducing oil pressure into the space 82 behind the seal bars. This space 82 is rendered fluid tight by the U shaped leather seal 86, which is secured to the inner face of the seal bar 78 by the metal bar 87 and the screws 88. The check valves 83—Figures 6 and 7—are assembled in the stators 73 and 14 in such a manner that they oppose each other; hence, when pressure is introduced through one check valve the ball 84 in the opposite check valve seats within the retainer 85 thereby preventing the by-passing of pressure fluid and allowing pressure to be built up behind the seals in the space 82—Figure 10—and force them into fluid tight contact with the rotor. Further, the contacting face has the groove 89 which is in communication with the reservoir through the chipped groove 90 and the mating groove 91—Figure 10. From the foregoing it will be apparent that the seal bars 78 will work equally well regardless of whether pressure is introduced from chambers A and A' or B and B'.

Operating fluid is delivered to chamber A through the port 92—Figure 6—and to chamber B through the port 93. Ports 94 and 95 communicate with the reservoir and perform functions which will be hereinafter described. It will be noted that these ports are formed by pipes cast integral with the cylinder 16 thereby assuring full sized port openings and eliminating the danger of unremoved core sand entering and scoring the finished surfaces of the interior members.

The rotor 71 has two diametrically opposite vanes extending from the central hub to the cylinder wall thereby dividing the interior of the cylinder into four chambers. Chambers A and A' are intercommunicating through the pipe 96; chambers B and B' being similarly connected by the pipe 97. The rotor is centrally retained within the cylinder by the anti-friction collars 98 and 99—Figures 5, 10, and 11, which enter mating bores in the rotor base and brake cylinder. The stop bars 100—Figure 6—and shims 101 secured to the stators by the screws 102 provide a means for slight adjustment for the point of stoppage of the rotor 71 at the full open or closed position; relative to the butterfly leaf.

Figure 11:
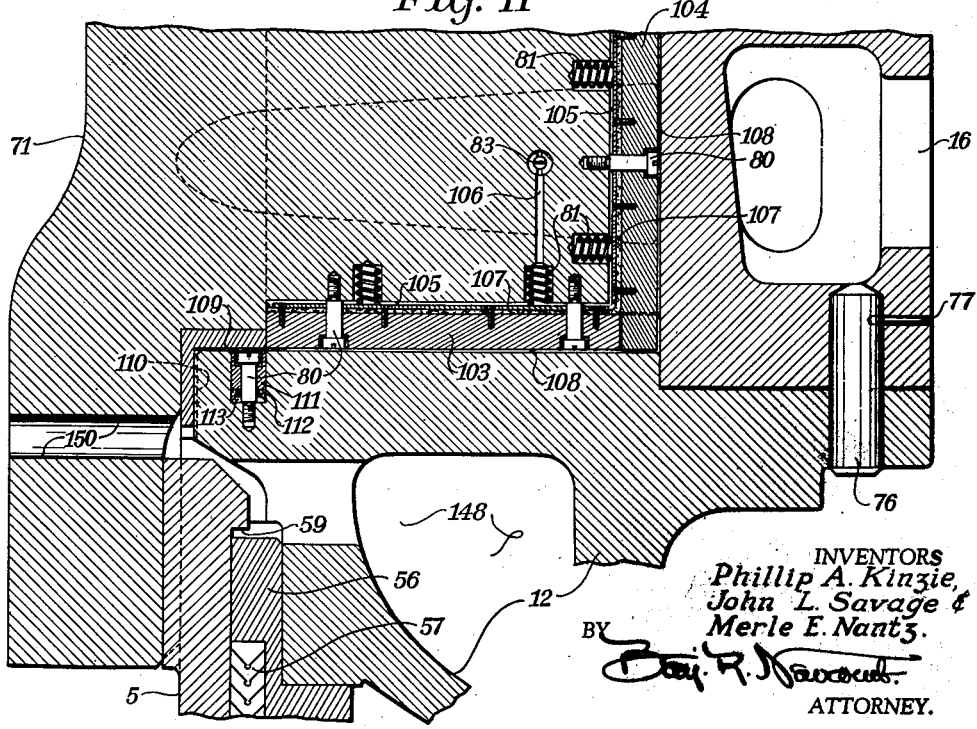
Figure 11 is a sectional view taken on the plane 11—11 of Figure 6.

The vanes of the rotor are grooved to receive the horizontal seal bars 103—Figures 5 and 11— and the vertical seal bars 104 which are mortised into the seal bars 103. These seals are installed and function similar to the stator seals; therefore identical parts will be indicated by the same numerals. The seal bars 103 and 104 are held in contact with their respective cooperating surfaces by the springs 81 and by oil pressure introduced into the space 105 through the holes 106. The check valves 83 in the rotor vanes function in the same manner as those in the stators. The continuous U shaped leather seal 107 attached to the inner faces of the seal bars 103 and 104 keep the passage 105 fluid tight. The groove 108 in the contact faces of seal bars 103 and 104 communicate through grooves 109 and 110—Figure 11—to the reservoir.

The ring seals 111 contained within grooves in the rotor base and brake cylinder prevent leakage past the hubs of the rotor. The ring seals 111 like the rotor and stator seals are held against the cooperating surfaces by springs 81 and have a U leather seal 112. Pressure is introduced behind the seals in the space 113 by drilled holes 114—Figures 5 and 10—communicating with the space 82 behind the stator seals 78. These seals likewise have a central groove 115 which is in communication with the reservoir through the grooves 109 and 110.

The rotor extension 116—Figure 5—concentric with and rigidly attached to the rotor 71 by the fitted screws 117, has machined thereon the splines 118, which slidably engage mating splines in the brake disks 119.

The opposing cones of the brake disks 119 are held in frictional engagement with mating seats in the brake cylinder 19 and the cover 20, by the compression springs 120. The inner hubs are matingly received by bores in the brake cylinder 19 and the cover 20, and are provided with the piston rings 121 to prevent escape of fluid pressure past these hubs. The seal ring 122, set into cooperating grooves in the brake disks 119, prevents the intrusion of fluid pressure between the inner faces of the brake disks. Further, this inner area is provided with the holes 123 communicating with the central passage 152.

The brake cylinder 19 and cover 20 are secured to the cylinder 16 by the studs 124. Torque from the upper brake disk is transmitted from the cover to the brake cylinder by the horizontal dowels 125.

The automatic brake release valve 126 is contained within a bore on the downward facing surface of the cover 20. The flanged valve member 127—Figure 9—is bolted fluid tight to the cover and is centrally bored to slidably receive the valve member 128, which is held in the downward position normally, by the spring 129 and is retained by the nuts 130 and 131 threaded into the upper and lower portions of the central bore. The top of valve 128 is counterbored and has an extending stub for centralizing the spring 129, while the lower portion has the annular groove 132 and drilled holes 133. The upper retaining nut 130 is counterbored to receive the spring 129, while the lower retaining nut 131 has a central port 134 and is recessed at the top to permit communication with the drilled holes 133. Fluid pressure is introduced to the upper surface of the valve 128 by the drilled hole 135, the annular groove 136 and the drilled holes 137 and 138. Thus, it will be apparent that when pressures of the same intensity are introduced on the upper and lower portions of the valve 128 the valve will remain in the normal or closed position through the differential effected by the spring 129; however, when pressure is released from the upper portion of the valve 128, as is the case when the oil pump motor is stopped, the continuing pressure on the underside of the valve 128 effected by the springs 120 will cause the valve 128 to move upward along its axial center line and bring the annular groove 132 into communication with the annular port 139 thereby allowing the discharge of fluid pressure into the reservoir above through the hole 140; likewise, fluid pressure will be discharged around the lower lip of the valve into the annular port 141 and thence into the annular groove 136 through the holes 142.

The indicator cover 21—Figures 1, 4, and 5— has an aperture through which the position of the valve may be directly read by the graduations on the indicating dial segment 143 which is rigidly attached to the stem extension 116. Electrical position indication is provided by the selsyn transmitter 144, attached to the plate 145, extending into the counterbore at the top of the stem extension 116. On the selsyn shaft the coupling 146 engages a plate diaphragm which is welded fluid tight within the aforementioned counterbore.

The mercury switch 147—Figure 5—is mounted on a bracket, rigidly secured to the indicator cover 21, and is actuated by a trip on the top of the stem extension.

The reservoir areas, 148 in the rotor base 12 and 149 in the cover 20 are intercommunicating through the central passage and reservoir area 152 by the drilled holes 150 and 151. The reservoir areas 153 and 154 in the stators—Figure 6—communicate with the area 149 through the hole 155 and with the area beneath the lower brake disk hub through the passage 156. The holes 157 provide communication of the area under the brake disk hub with the central passage 152. The ferrules 158—Figures 5 and 10—provide fluid tight connection between the cylinder, brake cylinder and rotor base, in the passages 155 and 156.

The details of the rotor control unit are illustrated in Figures 12 to 21 inclusive. By reference to these figures it will be seen that four ports 159, 160, 161, and 162—Figure 14—mate with the ports 94, 93, 92, and 95—Figure 6—respectively. The control valve 163 which is of the spool type is so designed that two pairs of ports are brought into communication at once and is so arranged that movement along the axial center line reverses the direction of flow through the aforementioned ports.

The movement of the control valve 163 is automatically and electrically controlled and is produced by the motor 164—Figures 13 and 14. The motor 164 is connected to the worm shaft 165 by the coupling 166, and drives the worm gear 167 through the worm 168 which is keyed to the worm shaft 165—Figures 20 and 21. The worm bearing 169 adjacent to the coupling is provided with the packing 170 and gland 171 to prevent the escape of lubricating oil placed therein through the T 172, while the worm bearing 173 on the opposite end is bored to receive the extending end of the worm shaft 165. The holes 174 provide lubrication for these bearings. The worm gear 167 is in keyed engagement with the extended hub of the planetary pinion 175. The planetary gear 176 meshes with the pinion 175 and with the stationary internal ring gear 177 and rotates on the pin 178 set into the rack crank 179; hence, when the pinion 175 is turned the planetary gear 176 will travel around the internal ring gear 177, thereby rotating the rack crank 179. The rack crank 179 has the gear teeth 180 meshing with the cylindrical rack 181—Figures 14, 15, and 20—on the control valve. The cylindrical rack 181 is flexibly mounted with the control valve 163 by the springs 182—Figure 15—which are retained and caused to bear against the integral collar at the center of the control rack by the stud 183, thereby providing a means for preventing the overloading of the parts within the drive mechanism by allowing additional axial movement of the rack after the control valve 163 has stopped. The limit switch shaft 184—Figure 20—is matingly received within a bore in the rack crank 179 and is securely pinned therein. The shaft extends outwardly through the bore in the planetary pinion 175 and the bearing 185 in the worm gear cover 186, thereby providing a centralizing means for the worm gear 167 and planetary pinion 175. The pinion 187 is keyed to the reduced end of the limit switch shaft 184 and is secured thereon by the nut 188. The rack 189 meshes with the pinion 187 and has the extended portions 190—Figure 13—which are slidably received within cooperating bores in the worm gear cover 186. The rack 189 has a central trip pin 191 which engages the adjustable screws 192 on the mounting blocks 193 thereby providing a means for tipping the mercury switches 194, which through the arrangement of their electrical contacts effect the desired control. Positive action is secured by the spring 195, while the point of stoppage is provided by contact of the plates 196 with the boss 197. The mounting blocks 193 are pivoted and retained by the capscrews 198. The mercury switches 194 are protected against damage or intrusion of foreign substances by a cover 199—Figures 12 and 17.

The cap 200—Figures 14 and 15—prevents the escape of operating fluid and provides a stop for the control valve 163. Fluid lock of the control valve 163 is prevented by the groove and hole 201 which maintain the fluid in the area between the cap 200 and control valve at reservoir pressure.

The spring 202 within the counterbore in the relief valve 203—Figure 15—produces an axial thrust which is received on the extended end of the handwheel shaft 204. When fluid pressure is introduced from the passage 205 through the hole 206 into the annular port 207, action of this pressure on the shoulder 208 effected by the reduced portion of the relief valve will produce a force tending to compress the spring 202. Excessive pressure will cause the valve to move along its axial center line until the passage 205 will be in communication with the passage 209 and allow fluid to be by-passed to the reservoir. Fluid lock of the relief valve is prevented by the groove 210 and the hole 211 which maintain the fluid in the area between the relief valve and plug 212 at reservoir pressure.

The flat surfaces on the threaded plugs 212 provide a means for applying a wrench thereto and thereby alter the point of stoppage of the control valve 163 or the compression on the spring 202 in the control valve 203. The caps 213 which are screwed on the extending ends of these plugs together with the gaskets 214 prevent the escape of fluid from the interior of the unit.

A manual means for releasing the relief valve 203 is provided by the handwheel 215. The handwheel shaft 204 is rendered fluid tight by the packing 216 and gland 217, and has adjacent to its inner end the threaded portion 218 mating with cooperating threads in the stuffing box 219; hence, by rotating the handwheel 215 axial motion of the shaft 204 will be produced and transmitted to the relief valve 203.

The screen 220—Figures 15, 16, and 18—is contained within a reinforcing tube 221 having the holes 222 drilled to permit the flow of oil therethrough. The screen unit is retained within the control valve body 223 by the studs 224 through the integral flange portion 225.

The valves 226 and 227—Figures 15, 16, and 18—afford a means for filling and hydraulically locking the rotor unit. The valves are closely fitted within mating bores in the control valve body 223; being retained by the stuffing boxes 228 and rendered fluid tight by the packings 229 and glands 230. The squared end 231—Figures 15 and 17—on the extended shaft of the valve 226 enters a mating squared hole in the driving gear—232; likewise, the squared end 233—Figures 16 and 17—enters a mating squared hole in the driven gear 234. In mesh with gears 232 and 234 the idler gears 235—Figure 17—comprise a train whereby both valves are turned in unison by the crank 236. All gears are retained within the case and cover 237; the entire unit being held in place by the tap bolts 238 and the washers 239. The lock 240—Figures 15 and 17—provides a means for locking the crank 236 and the enclosed gear train in any of the three positions as designated on the flange of the crank; i. e., Run, Stop, or Fill.

The suction piping 241—Figures 4, 5, 13, 17, and 18—connected to the passage 209 in the control body, supplies operating fluid to the pump 14—Figures 1, 4, and 5—which pumps the fluid back into the passage 205 in the control body 223 through the pressure piping 242. The brake release piping 243—Figures 4, 5, and 9—connects passage 205 in the control body 223 with the brake release valve 126 through the hole 135 and also connects the under side of the lower brake disk 119 with this passage through the hole 244. The piping 245—Figure 5—and valve 246 perform a function in the filling of the rotor reservoir by providing a communication between the piping 242 and the reservoir area 148.

With the foregoing description of the mechanics of our invention in mind, the method for filling the reservoir and interior portions of the torque unit as well as a description of the opening and closing cycles of the valve will now be given.

In order to work properly the interior of the torque unit as well as all piping, ports, etc., must be completely filled with a fluid. For our unit we prefer to use oil although other fluids may be found to be entirely satisfactory. For filling the interior reservoir areas the crank 236 is revolved 180°, from the position shown in Figure 17; thereby bringing the word Fill opposite the indicating diamond. It will be noted that the valve 226 will be closed but that the valve 227 will be open due to the fact that it is provided with two port openings as may be seen on Figure 18. By removing the plug 247—Figures 15 and 16—a suction hose or pipe line may be screwed into this aperture and connected to the oil supply drums or containers. The valve 246—Figure 5—is then opened and the vent plugs removed; i. e., 248 on the control valve body—Figures 12, 17, and 18—249 on the brake cylinder and 250 and 251 on the cover—Figure 5. Then by starting the oil pump 14, oil will be drawn from the supply drums through the screen 220 and into the pump 14 through the suction piping 241. The pressure piping 242 will convey the oil from the pump to either chambers A and A' or B and B'; depending on the position of the control valve 163, while the filling pipe 245 will fill the interior reservoir system by discharging oil into chamber 148 which is inter-communicating with all reservoir areas. The air vent plugs are to be replaced when oil appears at their respective elevations, and when oil appears at the elevation of the sight glass in the gauge 252—Figure 5—the valve is ready for service.

During the opening or closing cycle of our butterfly valve, all parts and units are automatically controlled; so that, the "human element" does not enter into the proper functioning of the valve.

Assume the valve to be in the closed position with the rotor in the position indicated by the dotted lines on Figure 6. The handle 253 on the control panel 18—Figures 4 and 5—is turned to the "open" position thereby establishing electrical contact through the mercury switch 147 at top of rotor mechanism with the electric by-pass control 9 which opens the needle valve 8. When water pressure has been equalized on both sides of the butterfly leaf, the equalized pressure switch 254—Figure 1—completes an electrical circuit which starts the motor 164 on the control unit 17 and thereby correctly positions the control valve 163. The mercury switches 194—Figure 13—stop the motor 164 and then simultaneously start the motor on the grease pump unit 15 and the oil pump motor 13—Figure 1.

With the control valve 163 in the position (as shown) for opening—Figure 14—oil is drawn from the reservoir area 153—Figure 6—through the pipe 95 into the port 162 and into passage 209; thence through the screen 220 and into the pump 14 through the suction piping 241. Pressure oil is delivered by piping 242 (valve 246 is closed) into the passage 205 where it is directed by the control valve 163 through ports 161 and 92 into chamber A which is in communication with chamber A' through the pipe 96—Figure 6. At the same time, oil is delivered by the passage 205 to the brake release piping 243—Figure 5—entering passage 135—Figure 9—and locking the brake release valve in the closed position in the manner previously described. Oil also enters the passage 244 and exerts upward pressure on the under side of the lower brake disk 119 thereby disengaging the conical braking surfaces by raising the brake disk and compressing the springs 120. Oil then passes upward between the released braking surfaces and enters the top side of the upper brake disk 119 through the slot 255 and the hole 256 and compresses the springs 120 still further thereby disengaging the conical braking surfaces on the upper brake disk 119. With the two brake disks 119 disengaged the pressure imparted on the vanes of the rotor 71 by chambers A and A' will impart the necessary torque for opening the leaf 2. The oil displaced from chamber B' flows into chamber B through the pipe 97, thence into the control valve 223 through the ports 93 and 160 where it is directed into the reservoir area 153 by the control valve 163 through the ports 159 and 94.

The pressure gauge 257—Figure 4—and pressure cutout switch are connected with the chamber 205 by the piping 258—Figures 13 and 15—and the drilled holes 259 and 260; hence, when pressure is built up in chamber 205, as the rotor 71 comes to rest on the seat bars 100—Figure 6—the pressure cutout switch will break an electrical contact and stop the oil pump motor 13 and grease pump motor 15. The drop in oil pressure due to stopping the oil pump 13 will allow the springs 120 between the brake disks 119 to become effective and discharge oil through the brake release valve 126 into the reservoir 149 above; thereby permitting the brake disks 119 to engage the conical seats in the brake cylinder 19 and cover 20 and so lock the mechanism in the new position.

It is well known to those versed in the hydraulics and operation of butterfly valves that valves of this type tend, after closure from the fully opened position is started, to close themselves, when water or other fluid is passing therethrough. This tendency of the leaf to overrun the operating unit must be carefully controlled in order to prevent the leaf from slamming shut and damaging the seals; or worse, rupturing the valve body. How carefully this contingency is eliminated will be apparent from the description of the closing cycle.

For closure, the handle 253 on the control panel 18 is turned to the "close" position thereby establishing contact with the control valve motor 164 which correctly positions the control valve 163; after which, the motor 164 is stopped and the oil pump motor 13 and motor on the grease pump unit 15 are started by the mercury switches 194.

When serviced for closure, the control valve 163 does not bring the ports 160 and 205, nor ports 161 and 209 into full communication—only moving far enough to allow partial communication between the aforementioned pairs of ports; thereby effecting a throttling action on the oil passing therethrough. The adjustable plug 212 provides a means for varying the amount of throttling necessary as dictated by actual operating conditions. Further, it will be noted that oil being discharged from chambers A and A' does not flow into the reservoir but is delivered directly to the oil pump 14 through the ports 92, 161, passage 209, and the piping 241. Since this is true, when the leaf 2 tends to turn the rotor 71, the resultant increase in pressure in chambers A and A' cannot escape faster than it is being pumped into chambers B and B' through the piping 242, passage 205 and ports 160 and 93. Hence, by this provision and by the throttling of the ports as previously described the speed of closure of the leaf 2 is in constant control.

A means for drawing additional oil into the oil pump 14 to make up for oil which may have escaped past the seals and provide the necessary additional oil for disengaging the brake disks 119 is provided by the ball check valve 261—Figure 18—which is retained by the cage 262. This permits oil to be drawn from the reservoir area 153 into passage 209 through port 162 in order to offset any partial vacuum in the passage 209 caused by the leaf tending to overrun the torque unit, but does not allow oil to escape into the reservoir under the conditions previously described.

When the rotor 71 comes to rest on the bars 100 and the leaf is closed, the pressure cutout switch will stop the oil pump motor 13 and the motor on the grease pump unit 15. Contact will have been reestablished with the electric by-pass control 9 by the mercury switch 147 thereby closing the needle valves 8 and thus completing the closing cycle.

While in the foregoing we have described specific embodiments of our invention; it is nevertheless to be understood that in practicing the same we may resort to any and all modifications falling within the scope of the appended claims defining the invention.

What is claimed is—

1. In combination, a valve element and an actuating rotor therefor, a separate casing for each and with rigid connection between the casings, hollow coupling means between the valve element and rotor and a diaphragm within the coupling means providing a fluid-tight division between the element and rotor.

2. In combination, a valve element and actuating rotor therefor, a separate casing for each and with rigid connection between the casings, a flexible coupling means between the valve element and rotor and including a hollow member having a transverse division between the element and rotor, and means journaling the valve element in its casing adapted to compensate for any pressure deflection of the valve element.

3. In combination, a valve including a casing, a rotary motor surmounting the casing and rigidly connected therewith, said motor including operating, lubricating and positioning mechanisms assembled as a complete unit, flexible means connecting the valve and motor in driving relation, and journaling means mounting the valve in its casing and adapted to compensate for deflection of the valve due to load.

4. In a butterfly valve, a valve element, a casing therefor, and an operating motor associated with the casing to operate the valve element, said motor including a rotor and stators encased in an oil-tight housing mounted rigidly upon the valve element casing, and means for hydraulically actuating the rotor.

PHILLIP A. KINZIE.
JOHN L. SAVAGE.
MERLE E. NANTZ.